Oct. 7, 1958
H. W. DIETERT
2,854,714
APPARATUS FOR MEASURING AND CONTROLLING MOISTURE
CONTENT OF MATERIAL
Original Filed Feb. 25, 1952
3 Sheets—Sheet 1
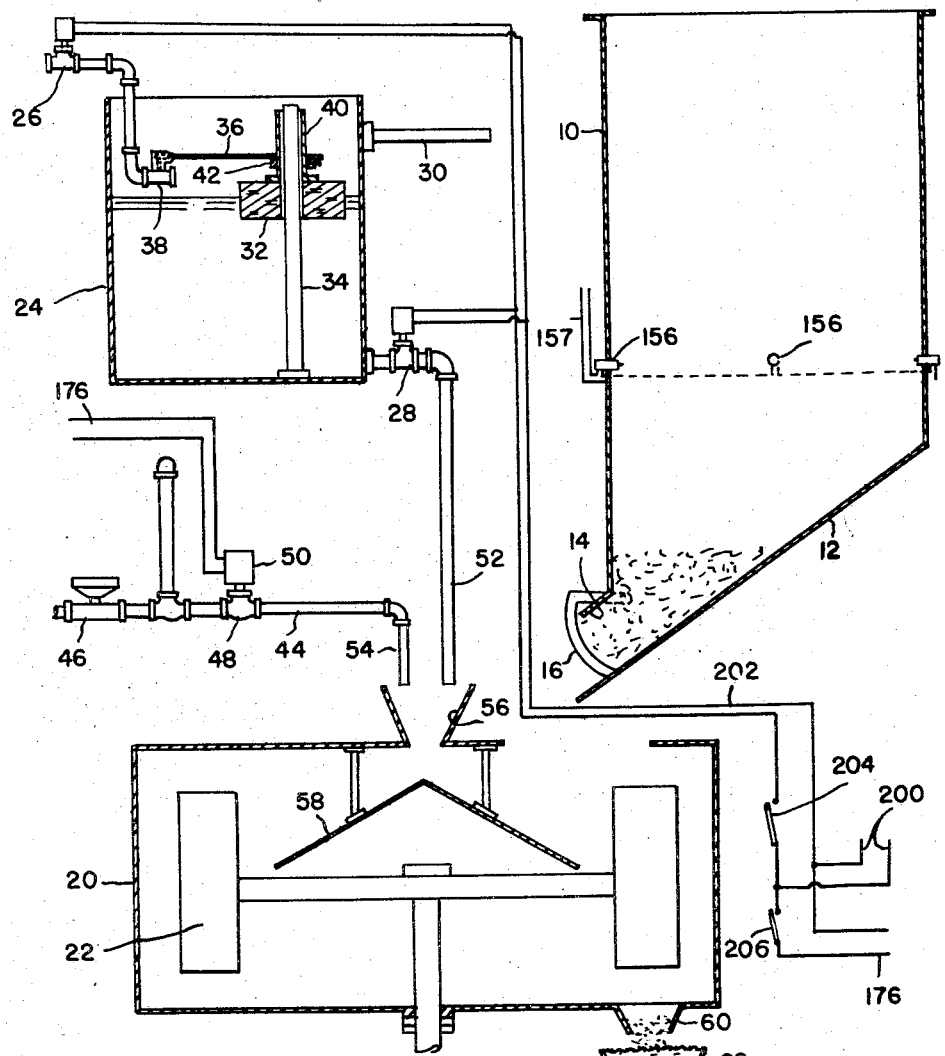
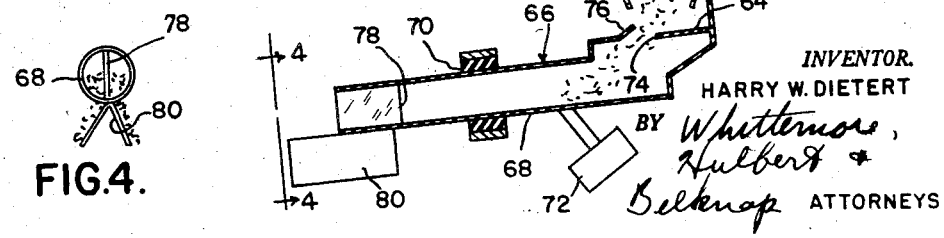
INVENTOR.
HARRY W. DIETERT
BY Whittemore,
Hulbert &
Belknap ATTORNEYS Oct. 7, 1958         H. W. DIETERT         2,854,714
APPARATUS FOR MEASURING AND CONTROLLING MOISTURE
CONTENT OF MATERIAL
Original Filed Feb. 25, 1952         3 Sheets-Sheet 2
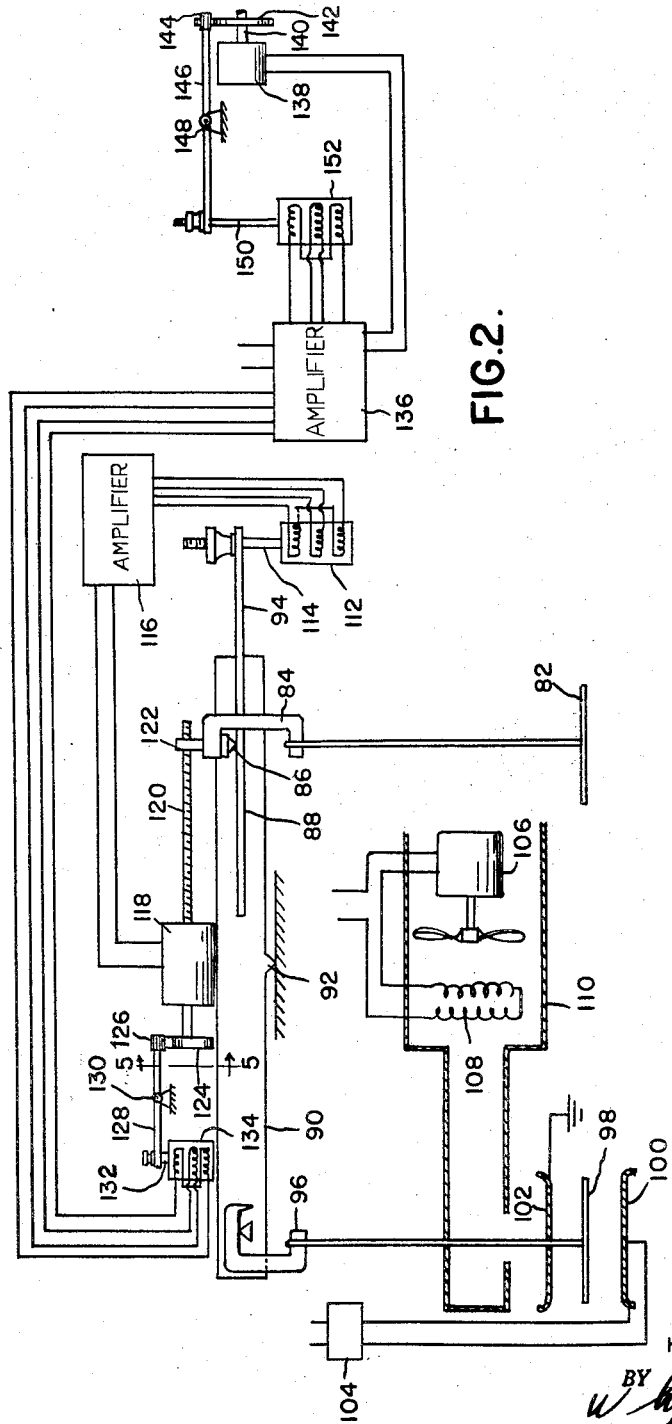
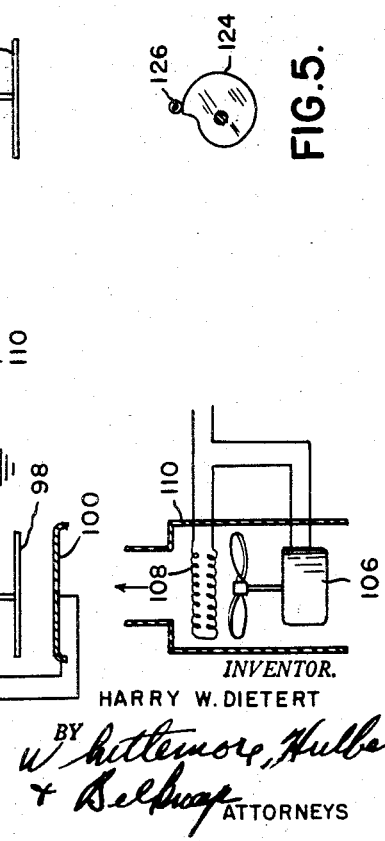
INVENTOR.
HARRY W. DIETERT
ATTORNEYS Oct. 7, 1958 H. W. DIETERT 2,854,714
APPARATUS FOR MEASURING AND CONTROLLING MOISTURE
CONTENT OF MATERIAL
Original Filed Feb. 25, 1952 3 Sheets-Sheet 3

*INVENTOR.*
HARRY W. DIETERT
BY Whittemore,
Hulbert &
Belknap ATTORNEYS

United States Patent Office 2,854,714
Patented Oct. 7, 1958

2,854,714

APPARATUS FOR MEASURING AND CONTROLLING MOISTURE CONTENT OF MATERIAL

Harry W. Dietert, Detroit, Mich., assignor to Harry W. Dietert Company, Detroit, Mich., a corporation of Michigan Original application February 25, 1952, Serial No. 273,270. Divided and this application October 17, 1955, Serial No. 540,859

5 Claims. (Cl. 22—89)

The present invention relates to apparatus for measuring and controlling moisture content of material.

The present application is a division of my prior copending application Serial No. 273,270, filed February 25, 1952.

The present invention is applicable broadly to the measurement and control of moisture in any moist mixture and finds one of its most useful applications in controlling the moisture content of foundry sand. It is found that the proper moisture content of foundry sand is dependent upon the temperature of the sand and accordingly, the present apparatus includes means for measuring the temperature of the sand and for introducing automatic control of the moisture content in accordance with the temperature of the sand.

It is an object of the present invention to provide apparatus which may be fully automatic or partly automatic for measuring and controlling the moisture content of solid material.

It is a further object of the present invention to provide means for withdrawing a moist sample, separating the sample into parts, drying one of the parts, and comparing the specific gravity of the parts so as to determine the moisture content of the sample.

It is a further object of the present invention to provide apparatus of the character described above in which the moist sample is divided into equal parts, and equal volumes of the dry and moist parts of the sample are brought into balance on a balance arm.

It is a further object of the present invention to provide in apparatus of the character described means for dividing a moist sample of material into equal parts.

It is a further object of the present invention to provide in apparatus of the character described, a solenoid controlled valve for applying water or other liquid to a moist mixture in a mixture, and means for controlling the solenoid valve responsive to the percentage of moisture in the mixture.

It is a further object of the present invention to provide in apparatus of the character described, adjustable timing means for varying the proportional part of equal successive intervals during which means responsive to the percentage of moisture in the mixture is effective to open the solenoid valve for the addition of liquid to the mixture.

It is a further object of the present invention to provide in apparatus of the character described, a first differential transformer operated by imbalance of a balance arm and electrically connected to a first motor, means operated by the motor for restoring balance of the balance arm and for controlling a second differential transformer, a second motor electrically connected to the second differential transformer operatively connected to position an indicating and control element, a third differential transformer connected in bucking relation to said second differential transformer and control means for said third differential transformer actuated by or in definite relation to said element.

Other objects and features of the invention will become apparent as the description proceeds, especially when taken in conjunction with the accompanying drawings, wherein:

Figure 1 is a diagrammatic view partly in section, of a portion of the apparatus for controlling the percentage of moisture of solid material.

Figure 2 is a diagrammatic view partly in section, of a second portion of the apparatus for controlling the percentage of moisture in a mixture.

Figure 4 is a fragmentary view looking in the direction of the arrow 4—4, Figure 1.

Figure 5 is a fragmentary sectional view on the line 5—5, Figure 2.

Figure 3:
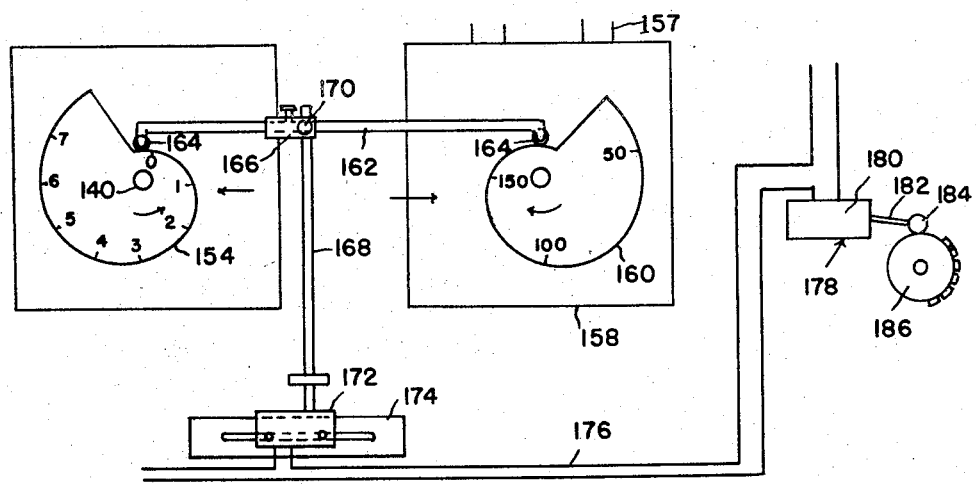
Figure 3 is a diagrammatic view of the remainder of the apparatus.

Figures 1, 2 and 3 together comprise a diagrammatic illustration of the complete apparatus and these figures should be considered together.

Referring first to Figure 1, the apparatus comprises a hopper 10 in which a quantity of dry solid material such as sand is contained. The hopper 10 includes an inclined bottom wall 12 and a discharge opening 14 adapted to be closed by a pivoted gate 16 to discharge the sand from the hopper. Located beneath the hopper and in position to receive sand discharged through the opening 14 is a mixer 20 having mixing paddles 22 therein.

Independent means are provided for adding water to the mixer. For controlling the first or major addition of water there is provided a tank 24 having a solenoid controlled inlet valve 26 and a solenoid controlled outlet valve 28. The tank 24 is provided with an overflow outlet 30 and includes a float 32 vertically movable on a guide rod 34 and connected through a lever 36 to a shut-off valve 38 whereby the level of liquid in the tank 24 is controlled by the float and is adapted to shut-off flow of liquid into the tank even though the solenoid valve 26 is open. The float 30 has an upwardly extending sleeve 40 on which is mounted an adjustable collar 42 whereby the level at which the float 32 shuts off inflow of water to the tank 24 may be adjustably controlled.

The purpose of the tank 24 is to introduce a relatively large but measured quantity of water to the mixer to bring the percentage of moisture of the sand up to approximately the desired value, although slightly below the final desired percentage of moisture.

Means for making a second and further addition of water is provided and comprises a water line 44 including a pressure regulator valve 46 and a solenoid controlled valve 48 including the solenoid 50.

As illustrated in Fig. 1, the tank 24 includes a discharge line 52 and the water line 44 includes a discharge connection 54, both of which discharge into a flanged opening 56 onto a baffle 58 located in the mixer 20.

The mixer 20 includes an outlet opening 60 from which a sampling of moist sand is discharged to a riddle 62 onto a support 64 provided on a sample dividing device indicated generally at 66. The sample dividing device includes a tube 68 mounted for movement as for example in a rubber bushing 70, and has associated therewith a vibrator 72. The tube 68 is slightly inclined as illustrated and the vibrator is actuated so as to cause the moist material to progress to the left thereon. The support 64 includes an opening 74 having a knife 76 adapted to cut a thin slice of moist sand from the riddled sample. Located in the tube 68 is a vertical knife 78 and as the moist sample of sand is caused to progress to the left as seen in Figure 1, a blade or knife 78 divides the sample into equal parts. These parts are separated, as for example by a ridged divider 80 for further treatment.

Referring now to Figure 2, one of the parts of the sample of sand is brought either manually or automatically, to position on a platform 82 which is suspended from a hook 84 including a pointed element 86 slidable along a member 88 carried by a balance arm 90. The balance arm 90 as illustrated in the figure, has a central pivot point 92 and includes a projecting element 94 for a purpose later to be described. At the opposite end of the balance arm 90 a second hook 96 is provided from which is suspended a platform or pan 98 on which a second part of the sample is supported. Means are provided for drying the part of the sample on the platform 98 and this means comprises a pair of spaced electrodes 100 and 102 which are suitably connected to a high frequency generator diagrammatically indicated at 104. Thus, for example, when a high frequency field is established having a frequency of approximately 15 megacycles, it is found that a 50 gram sample on the platform 98 can be dried in approximately 30 seconds.

In addition to the high frequency field, supplies of heated air are directed gaainst the bottom and top of the left hand pan or platform 98. For this purpose blowers 106 and heated elements 108 are provided in casings 110 suitably disposed to direct the heated air over the sample to be dried. In practice, the air is heated to approximately 230 degrees Fahrenheit and in conjunction with the high frequency field, quickly dries the sample and prevents condensation of steam on the cold electrodes of the high frquency unit or the sample pan.

When equal quantities of moist mixture are placed on the pans 82 and 98, the balance arm 90 will be in balance if the pans are located equidistant from the pivot point 92 of the balance arm. When however, the sample carried by the pan 98 is dried, the heavier moist sample on the pan 82 will over-balance and will cause a rocking of the balance arm to the right.

A differential transformer 112 is provided having a controlling core therein connected by a rod 114 to element 94. The differential transformer may be of a type available on the open market under the trade name "Atcotran," and in any case is of a type adapted to develop an output current variable in magnitude and direction in accordance with the position of the core therein. For this purpose the transformer normally contains a clockwise and a counterclockwise wound field coil in conjunction with a primary coil. The output of the transformer 112 is transmitted to an amplifier 116 which in turn is connected to a motor 118 of the 3-wire reversible synchronous capacitor type, and the motor 118 is thus driven in a direction dependent upon the direction of movement of the core in the transformer 112. The motor 118 drives a screw shaft 120 which is threaded into a nut 122 carried by the hook 84, and accordingly repositions the hook. The transformer, amplifier, and motor are so wired that upon displacement of the core in the transformer, the motor is driven in a direction tending to restore the balance of the balance arm 90.

Also connected to the motor 118 is a cam 124, the shape of which is best seen by referring to Figure 5. The connection may include suitable reduction gearing. The cam 124 has associated therewith a cam follower 126 carried by a lever 128 pivoted as indicated at 130, and connected to the opposite end of the lever 128 is a rod 132 which in turn is connected to a movable core of a second differential transformer 134 which may be identical with the transformer 112 previously described. The output of the differential transformer 134 is connected through a second amplifier 136 to a second motor 138 which may be identical with the motor 118 previously described. The motor 138 drives a shaft 140 carrying a cam 142 which may be identical with the cam 124 previously described. Associated with the cam 142 is a cam follower 144 carried by a lever 146 pivoted as indicated at 148 and carrying at its opposite end a rod 150 to which is connected the core of a third differential transformer 152, which transformer is identical with the transformers 112 and 134 previously described. The output of the transformer 152 is connected to the amplifier 136 in bucking relation to the connection of the transformer 134 so that when the cores of the transformers 134 and 152 are equally displaced, the motor 138 is de-energized. Obviously of course, the use of the amplifiers 116 and 136 is merely to amplify the relatively weak output of the transformers 112, 134 and 152, and if transformers with sufficient output are employed, the connection may be direct from the transformers to the motors. In any case the output of the transformers 134 and 152 are interconnected in bucking relation.

As a result of the foregoing, so long as the arm 90 is in imbalance or is unbalanced so that its right hand end, as seen in Figure 2, is depressed, the motor 118 is driven in a direction tending to move the hook 84 inwardly toward the pivot point 92. As soon as the hook 84 has been moved inwardly a sufficient distance the arm 90 returns to its horizontal balanced condition and the core of the differential transformer 112 returns to an intermediate neutral position, at which time energy ceases to be supplied to the motor 118. However, during this interval the motor 118 has rotated the cam 124 with the result that energy is transmitted from the transformer 134 to the motor 138, thus causing the motor 138 to move a direction and amount proportionate to the movement of the motor 118. This in turn causes a repositioning of the core of the differential transformer 152 so that when the balance arm 90 is rebalanced, both the motors 118 and 138 are at rest.

The shaft 140, which is driven by the second motor 138, has connected to it an indicating and control cam 154 which is illustrated in Figure 3. This cam may contain suitable graduations which will give a direct reading of the percentage of moisture in the moist sample withdrawn from the mixer since the position of the right hand pan knife edge on the balance beam or arm corresponds linearly with the percentage of moisture in the moist sample regardless of the total weight of the sample. This holds true as long as the two parts of the sample are of equal weight before drying. Thus, the percentage of moisture in the original sample is determined by a single weighing operation instead of the usual two or more weighing operations previously required. Moreover, the weighing operation not only produces an indication of the percentage of moisture but also operates as a component of the control mechanism as will now be described.

It was stated earlier that the desirable moisture content of the sand was in part dependent upon the temperature of the sand. For this purpose the hopper 10 is provided with a plurality, as for example four, thermocouples 156 which may conveniently be connected in series in the line 157 as indicated in Figure 1, and are associated with a temperature indicator 158, as seen in Figure 3. If the slide wire in the temperature indicator 158 is four times greater in reading than the indicator or recording scale, the indicator thus gives an average of the four temperatures recorded by the separate thermocouples 156. The temperature indicator 158 has associated therewith as an indicating and control element, a cam 160 which may be graduated as indicated to give a direct reading of temperatures. Thus, the cams 154 and 160 may be employed as means for controlling the addition of moisture to the sand in the mixer as will now be described.

A bar 162 is provided with rollers 164 at its ends which rest upon the peripheries of the cams 154 and 160 and accordingly will position the bar 162 in accordance with the instantaneous position of the cams. Movably mounted on the bar 162 is a slide 166 which may be moved toward or away from either of the cams 154 or 160 in order to vary the proportional control of these cams.

Normally, it is found necessary to make water additions more on the basis of moisture percentage than on temperature and accordingly the normal position of the slide 166 is toward the cam 154, as indicated in Figure 3. Carried by the slide 166 is a rod 168 which is adjustable as to height, and held in position by a set screw or equivalent device 170. Associated with the rod 168 is a switch 172, preferably a micro switch, which is longitudinally adjustable along a support 174 to position the switch directly beneath the slide 166. The switch 172 is normally open and is closed by the weight of the rod 168. The cams 154 and 160 thus each exert controlling influences which are integrated by the bar 162. When the integrated reading of the percentage of moisture and temperature is such as to call for the addition of moisture to the mixer, the rod 168 closes the switch 172 and completes a circuit through the line 176 which leads to the solenoid valve 50 indicated in Figure 1. In series in the circuit 176 is a timer device indicated generally at 178. The timer device 178 includes a switch 180 which may be normally open or closed, and is actuated to the opposite position by an arm 182 having a cam follower or roller 184 associated with a timing disc or cam 186.

Figure 6:
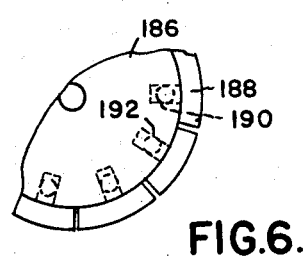
Figure 6 is an enlarged fragmentary view of timing mechanism employed in the apparatus.

Referring now to Figure 6, the timer disc 186 is provided with a plurality of removable buttons 188 having stems 190 receivable in recesses provided on the periphery of the disc 186 and retained in place by suitable means such as set screws 192. Conveniently, the timing disc 186 may be provided with 30 recesses for the reception of a button and any desired number of buttons may be provided on the periphery of the disc. Suitable means (not shown) are provided for rotating the disc 186 and conveniently this means may be selected to provide a rotation of the disc once in every 30 seconds. Accordingly, the addition of one button to the disc will provide for closure of the circuit to the solenoid valve 50 for one second out of each 30. Thus, if experience indicates that best results are obtained when the solenoid valve is open for 10 seconds out of each 30, 10 buttons will be provided on the disc and preferably arranged in continuous relation thereon.

The control circuit for the apparatus includes a line 200 and a branch circuit 202 controlled by a switch indicated diagrammatically at 204. Preferably, solenoid control valves 26 and 28 are so connected into the circuit that when the valve 26 is maintained in open position by its solenoid, the valve 28 is maintained in closed position by its solenoid, and vice versa. It is assumed that with the switch 204 open, the solenoid valve 26 is open and the solenoid valve 28 is closed. Accordingly, to operate the apparatus the switch 204 is first opened and is maintained open for an interval sufficient to permit the tank 24 to fill to a level as controlled by the float 32. The switch 204 may if desired be connected so that it is automatically closed when the float 32 reaches the position in which it closes the inlet shut-off valve 38. In any case, a predetermined amount of sand having been added to the mixer 20, the switch 204 is closed, thereby opening solenoid control valve 28 and admitting a predetermined measured quantity of water to the mixer 20. The paddles 22 mix the water and sand to a uniform mixture. Some of this uniform mixture is discharged from the outlet 60 through the riddle 62 onto the platform 64 of the divider 66. Due to vibration of the divider, this moist sample is continuously advanced to the left across the platform, some of it falling into a suitable receptacle and a slice of predetermined thickness passing through the opening 74 as a result of the action of the blade 76. This moist sample passes through the tube 68 and is divided into two equal parts which are physically separated by the inclined planes 80. Either manually or mechanically, equal parts of the samples are placed on the pans 82 and 102. At this time since both parts of the sample on the pans 82 and 102 are moist and are of equal volume the balance beam or arm 90 remains in balance. The high frequency generator 104, the blowers 106, and the heating elements 108 are energized which results in quick drying of the sample on the left hand pan 98 and accordingly, the right hand end of the beam 90 moves downwardly, thus unbalancing the differential transformer 112 and setting in effect the sequence of action previously described in conjunction with the motors 118 and 138, the transformers 112, 134 and 152, and the amplifiers 116 and 136, with the result that the pan 82 is moved to a new position of balance and the percentage moisture indicator cam 154 is moved to a position in which it gives a direct reading of percentage of moisture and a corresponding cam rise thereby resulting in positioning the bar 162 in accordance with the percentage of moisture. At the same time the temperature indicating cam 160 has been positioned and as a result, the integrating bar 162 is positioned in accordance with temperature and percentage moisture. If the percentage of moisture is less than desired for the particular temperature of sand, the switch 172 is maintained in closed position. Closure of the switch 206 at this time energizes the circuit 176 which is closed to energize the solenoid 50 of the solenoid control valve 48, if the switches 172 and 178 are closed. Thus, water is added at a definite rate to the mixer, as a result of the action of the pressure regulating valve 46, and it is added for a predetermined proportional part of successive equal intervals as a result of the operation of the timer 178. Thus, for example, if the timer is provided with 15 buttons and is rotated once every 30 seconds, water will be added to the mixer for 15 consecutive seconds out of each 30 seconds so long as the switch 206 remains closed.

If desired, the timer disc 186 may be caused to rotate continuously or to make one revolution and stop with the switch 180 in open position to enable a second sample to be divided and equal parts thereof placed on the pans manually, one part of the sample dried, and a new reading taken of the percentage of moisture. If the addition of moisture has not been sufficient, a second addition will be made.

In accordance with the foregoing the operation of the apparatus may be fully automatic or semiautomatic, as required.

In using the apparatus it is assumed first that the first addition tank 24 is filled to a level determined by the float 32 with water. Closure of the switch 204 drains the tank 24 into the mixer 20 and this water is mixed with the sand. In foundry practice, one is safe in adding 80% of the total water required for the first water addition for all batches. After the first water addition the material is allowed to mix usually for about one minute. If desired, a timer may be employed in the circuit which will close the switch 206 after mixing has proceeded for one minute. If the moisture and temperature cams 154 and 160 are so positioned that the switch rod 168 is against the micro switch 172, which will be the case if the moisture content is low or the temperature high, current will flow to the timer switch 178. This switch will open the solenoid valve 48 every 30 seconds or at selected time intervals for a predetermined interval. Water will thus flow into the mixer at frequent intervals for selected durations of time. This gives a rate control of water additions until both moisture percentage selected and temperature corrections are satisfied. At this point the moisture percentage and temperature cams will have lifted the integrating bar assembly, thus opening the switch 172 and causing the intermittent flow of water to the mixture to be stopped. It will be appreciated that during this operation additional samples of moist sand will be taken from the mixer, separated into equal parts, applied to the pans, one part of the sample dried, and additional readings procured as described above.

The apparatus described, either in fully automatic, semi-automatic, continuous, or intermittent form, provides means for obtaining moist mixtures and particularly foundry sand having an accurately controlled and definitely known percentage of moisture which may be automatically varied in accordance with variations in temperature of the sand. The apparatus calls for no particular skill on the part of the operator and thus permits accurate control of moisture in foundry sand by unskilled operators. Moreover, the operation is designed to require a minimum of effort or supervision.

The drawings and the foregoing specification constitute a description of the improved apparatus for measuring and controlling moisture content of material in such full, clear, concise and exact terms as to enable any person skilled in the art to practice the invention, the scope of which is indicated by the appended claims.

What I claim as my invention is:

1. Apparatus of the character described comprising a pivoted balance arm having supports thereon at opposite sides of its pivot for equal volumes of dried and moist samples, movable means for shifting one of said supports along said arm to vary the torque on said arm of the sample carried thereby, a first motor operatively connected to said movable means, a first differential transformer operatively connected to said first motor, said first transformer including a control member movable by said balance arm, a second differential transformer including a control member movable by said first motor, a second motor operatively connected to said second transformer, a movable indicating and control member operatively connected to said second motor, a third differential transformer including a control member movable by said second motor and connected in bucking relation to said second transformer, whereby as said balance arm is restored to balance by said first motor, said second motor is driven to position said indicating and control member in a position dependent on the movement of said first motor required to balance said arm, and then arrested.

2. In apparatus of the character described, means for withdrawing a sample of a moist mixture from a container, means for dividing said sample into equal parts, means for drying one of said parts, means for comparing the weight of said parts including a pivoted arm, sample supports carried by said arm at opposite sides of its pivot and means responsive to imbalance of said arm to shift one of said sample supports to rebalance said arm.

3. Apparatus of the character described comprising a pivoted balance beam having supports at opposite sides of its pivot for receiving specimens, the weight of which is to be compared, an electric motor, means connecting said motor to one of said supports for shifting said one support longitudinally of said beam, a current source for said motor including a differential transformer, a movable control member for said differential transformer, said control member being operatively connected to said beam for movement thereby and positioned such that when said beam is in balanced condition the output of said transformer is zero, a second differential transformer, means operably connected to said motor for controlling the output of said second transformer, a second motor connected to said second transformer for operation thereby, a third differential transformer, means operably connected to said second motor for controlling said third transformer, said second and third transformers being connected in bucking relation, and indicating means operably connected to said second motor to indicate the amount of travel of said second motor when it comes to rest after a balancing cycle.

4. Apparatus for controlling the addition of liquid to a moist material which comprises a pivoted balance arm, sample supports carried by said arm at opposite sides of its pivot support for receiving equal volume samples of the moist mixture, means for drying one of said samples, means responsive to imbalance of said arm and operatively connected to one of said supports to shift said one support longitudinally of said arm to rebalance said arm, the means responsive to the amount of movement of said one support to achieve rebalance including a movable member movable into positions dependent on the amount of movement of said one support required to rebalance said arm, means including a valve for adding liquid to the moist mixture, and valve control means operably connected to said movable member effective to open said valve while said one support is in a position indicating less than desired moisture content.

5. Apparatus for producing a moist mixture of solid material comprising a mixer, a liquid supply line leading to said mixer including a solenoid controlled valve for making additions of liquid to said mixer, means for withdrawing moist samples of mixed materials from said mixer, means for dividing said samples into parts, means for drying one of said parts, means for comparing the weight of moist and dry parts of a sample to determine the percentage moisture in a moist part of a sample including a member movable in accordance with such percentage, and means operatively connected to said member for controlling said solenoid valve to open said valve if the percentage of moisture is less than required, the means for comparing the weight of the dry and moist parts of a sample comprising a balance arm, sample supports on said balance arm for receiving equal volumes of dry and moist parts of a sample, and means responsive to imbalance of said arm for moving one of said sample supports along said arm to balance said arm.

References Cited in the file of this patent

UNITED STATES PATENTS

| | | |
|---|---|---|
| 1,484,358 | Norton | Feb. 19, 1924 |
| 1,536,589 | Keen | May 5, 1925 |
| 1,593,890 | Welch | July 27, 1926 |
| 1,736,505 | Mueller | Nov. 19, 1929 |
| 1,978,558 | Vander Horst | Oct. 30, 1934 |
| 1,997,826 | Krick | Apr. 16, 1935 |
| 2,040,729 | De Cissey | May 12, 1936 |
| 2,106,083 | Chappell et al. | Jan. 18, 1938 |
| 2,188,798 | Smith | Jan. 30, 1940 |
| 2,222,551 | Ziebolz et al. | Nov. 19, 1940 |
| 2,263,797 | Christensen | Nov. 25, 1941 |
| 2,273,126 | McGillin | Feb. 17, 1942 |
| 2,379,921 | Pizzirani et al. | July 10, 1945 |
| 2,407,513 | Pounds | Sept. 10, 1946 |
| 2,410,138 | Werner | Oct. 29, 1946 |
| 2,541,915 | Culver | Feb. 13, 1951 |
| 2,581,204 | Reilly | Jan. 1, 1952 |
| 2,622,438 | Campbell | Dec. 23, 1952 |
| 2,622,868 | Yeasting | Dec. 23, 1952 |
| 2,709,843 | Hartley | June 7, 1955 |

FOREIGN PATENTS

| | | |
|---|---|---|
| 600,210 | Great Britain | Apr. 2, 1948 |